United States Patent
Chen et al.

(10) Patent No.: US 9,822,319 B2
(45) Date of Patent: Nov. 21, 2017

(54) METHOD AND SYSTEM FOR GASIFICATION OF BIOMASS

(71) Applicant: SUNSHINE KAIDI NEW ENERGY GROUP CO., LTD., Wuhan (CN)

(72) Inventors: Yilong Chen, Wuhan (CN); Yanfeng Zhang, Wuhan (CN); Hongming Tang, Wuhan (CN)

(73) Assignee: SUNSHINE KAIDI NEW ENERGY GROUP CO., LTD., Wuhan (CN)

( * ) Notice: Subject to any disclaimer, the term of this patent is extended or adjusted under 35 U.S.C. 154(b) by 117 days.

(21) Appl. No.: 15/011,644

(22) Filed: Jan. 31, 2016

(65) Prior Publication Data

US 2016/0145514 A1   May 26, 2016

Related U.S. Application Data

(60) Division of application No. 13/745,858, filed on Jan. 20, 2013, now Pat. No. 9,290,707, which is a (Continued)

(30) Foreign Application Priority Data

Jul. 20, 2010   (CN) .......................... 2010 1 0234086

(51) Int. Cl.
*B01J 7/00*   (2006.01)
*C10J 3/84*   (2006.01)
(Continued)

(52) U.S. Cl.
CPC . *C10J 3/84* (2013.01); *C10J 3/20* (2013.01); *C10J 3/46* (2013.01); *C10K 1/002* (2013.01);
(Continued)

(58) Field of Classification Search
CPC .................. C10J 2300/0916; C10J 3/20; C10J 2300/1238; C10J 2300/1693;
(Continued)

(56) References Cited

U.S. PATENT DOCUMENTS

2008/0202028 A1*   8/2008   Tsangaris ................. C10J 3/005
                                                                    48/73
2008/0209807 A1*   9/2008   Tsangaris .................. C10J 3/20
                                                                    48/89
(Continued)

*Primary Examiner* — Imran Akram
(74) *Attorney, Agent, or Firm* — Matthias Scholl, PC; Matthias Scholl

(57) ABSTRACT

A system for gasifying biomass is disclosed. The system comprises a water storage tank, a water pump, a heat exchanger, a plasma torch heater, a gasifier, an ash cooler, a spray tower, a dust collector, a deacidification tower, and a desiccator. The water storage tank is connected to the water inlet of the heat exchanger; the vapor outlet of the heat exchanger is connected to the vapor inlet of the plasma torch heater; the vapor outlet of the plasma torch heater is connected to the vapor nozzle of the gasifier; the ash outlet of the gasifier is connected to the ash inlet of the ash cooler; the gas outlet of the gasifier is connected to the gas inlet of the spray tower; and the gas outlet of the spray tower is connected to the gas inlet of the heat exchanger.

4 Claims, 1 Drawing Sheet

Related U.S. Application Data continuation-in-part of application No. PCT/CN2011/076843, filed on Jul. 5, 2011.

(51) Int. Cl.

| | | |
|---|---|---|
| *C10J 3/20* | (2006.01) | |
| *C10K 1/06* | (2006.01) | |
| *C10J 3/46* | (2006.01) | |
| *C10K 1/00* | (2006.01) | |
| *C10K 1/02* | (2006.01) | |

(52) U.S. Cl.
CPC ............... *C10K 1/003* (2013.01); *C10K 1/02* (2013.01); *C10K 1/06* (2013.01); *C10J 2200/152* (2013.01); *C10J 2300/0906* (2013.01); *C10J 2300/0916* (2013.01); *C10J 2300/0973* (2013.01); *C10J 2300/0976* (2013.01); *C10J 2300/1238* (2013.01); *C10J 2300/1246* (2013.01); *C10J 2300/1653* (2013.01); *C10J 2300/1659* (2013.01); *C10J 2300/1665* (2013.01); *C10J 2300/1693* (2013.01); *C10J 2300/1853* (2013.01); *C10J 2300/1884* (2013.01); *C10J 2300/1892* (2013.01); *Y02E 20/18* (2013.01); *Y02E 50/14* (2013.01); *Y02E 50/18* (2013.01); *Y02P 20/145* (2015.11)

(58) Field of Classification Search
CPC ........ C10J 2300/1884; C10J 2300/0973; C10J 3/84; C10J 2200/152; Y02P 20/145
See application file for complete search history.

(56) References Cited

U.S. PATENT DOCUMENTS

| | | | |
|---|---|---|---|
| 2008/0210089 A1* | 9/2008 | Tsangaris | C10J 3/00 95/90 |
| 2008/0222956 A1* | 9/2008 | Tsangaris | C10J 3/005 48/77 |
| 2009/0064581 A1* | 3/2009 | Nielsen | C10J 3/18 48/78 |
| 2010/0115961 A1* | 5/2010 | Chapman | F23G 5/006 60/780 |
| 2010/0154728 A1* | 6/2010 | Kemper | C10B 19/00 123/3 |
| 2010/0275781 A1* | 11/2010 | Tsangaris | C10J 3/00 96/108 |
| 2011/0041404 A1* | 2/2011 | Yu | C10J 3/18 48/111 |
| 2011/0079171 A1* | 4/2011 | Capote | F23G 5/006 110/250 |
| 2011/0162278 A1* | 7/2011 | DePuy | C10J 3/84 48/62 R |
| 2011/0271883 A1* | 11/2011 | Chapman | C01B 3/342 110/258 |

\* cited by examiner

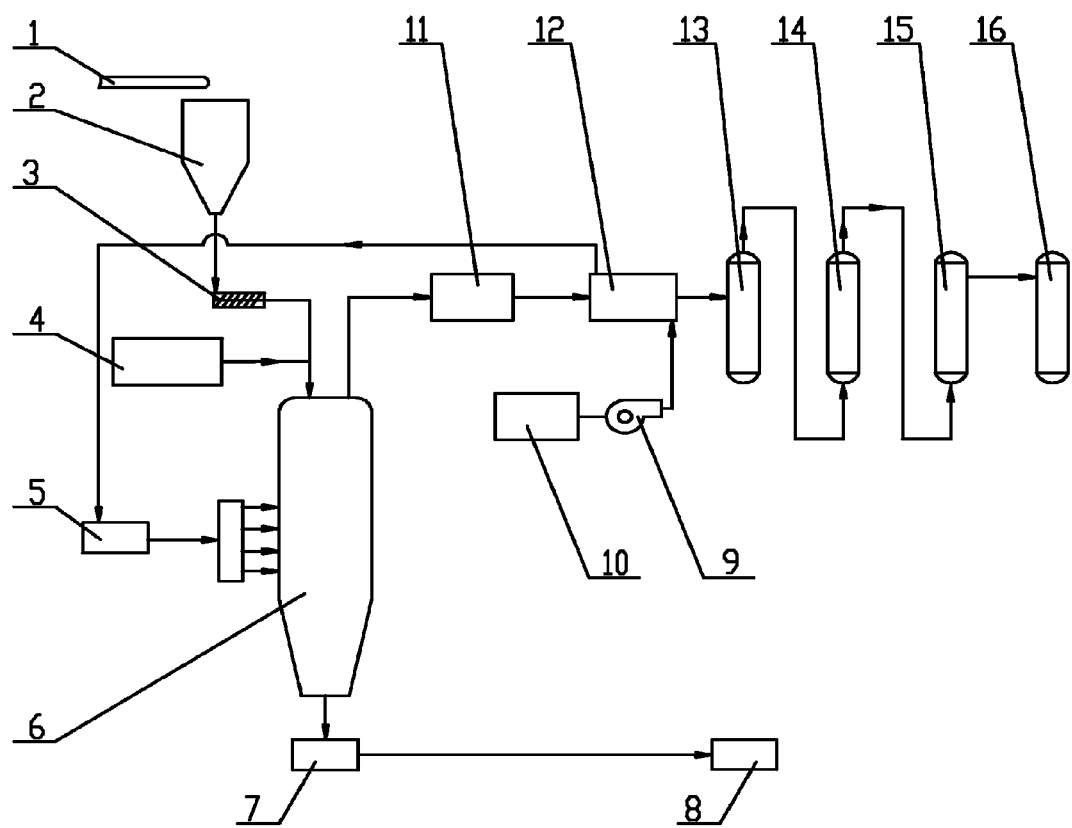

METHOD AND SYSTEM FOR GASIFICATION OF BIOMASS

CROSS-REFERENCE TO RELATED APPLICATIONS

This application is a divisional of U.S. Ser. No. 13/745,858 filed on Jan. 20, 2013, now pending, which is a continuation-in-part of International Patent Application No. PCT/CN2011/076843 with an international filing date of Jul. 5, 2011, designating the United States, and which further claims priority benefits to Chinese Patent Application No. 201010234086.6 filed Jul. 20, 2010. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a technology for transforming combustible materials into clean and highly efficient synthetic gas, and more particularly to a method and a system for indirect gasification of biomass using water vapor.

Description of the Related Art

A typical biomass gasification technology includes: fixed bed gasification, fluidized bed gasification, and two stages gasification, all of which are direct gasification technologies. The processes of direct gasification technologies are characterized in that the heat produced by part of the biomass supplies energy resource for gasification, the air, oxygenized air, or a combination of the oxygenized air and water vapor is functioned as an oxidant during the gasification reaction. However, studies have shown that technologies of direct gasification of the biomass are disadvantageous in the following aspects:

First, the components and the heat value of the biomass fuels are unstable, the biomass has low fire point and fast combustible reaction, thus, explosion easily occurs. When part of regions are superheated and coked, the operating temperature of the gasifier is very difficult to control.

Second, when the air works as an oxidant in which the content of the inactive gas of $N_2$ is prominent, it results in a higher content of $N_2$, a lower content of effective gas ($CO+H_2$), and a lower ratio of $H_2/CO$, besides, the heat value of the synthetic gas is low and unstable, which only maintains at 5000 $KJ/Nm^3$ below and hardly meets the need of the industrial utilization.

Third, when the oxygenized air works as an oxidant, although the content of $N_2$ is relatively lower, an additional air separating device is necessitated. Because of a large capacity and high energy consumption of the air separating device, such a process largely increases the production cost.

Fourth, when the oxygenized air and the water vapor work as both oxidants, although the content of $N_2$ in the synthetic gas is decreased, and the content of $H_2$ is increased, the water vapor working as a reacting medium still consumes a large amount of heat energy, plus the energy consumption in the air separation, the process largely maximizes the production cost.

Fifth, about 15-20% of the biomass is necessitated to self-ignite for providing the energy resource for gasification, but at the same time a large amount of $CO_2$ is produced in the combustion, correspondingly, the content of effective gas ($CO+H_2$) is decreased. Furthermore, the high temperature synthetic gas and the mixed air carry a large amount of sensible heat, and thus, the conversion of the heat energy into the chemical energy is largely minimized, and the efficiency of the cooled gas is also decreased, which is generally 70% below and no higher than 80% in exceptional conditions.

Sixth, the operating temperature of the gasifier is generally controlled at 800-1200° C., at such a temperature, the gasification of the biomass produces a large amount of tar which is difficult to remove, and too much of tar aggregated in the device and pipes is apt to cause pipe blocking and device contamination.

Seventh, the ash produced in the gasification of the biomass contains a prominent content of alkali metal oxides such as K and Na, which is general 20-40 wt. % of the total ash. However, at a temperature higher than 800° C., the alkali metal oxides is apt to be gasified and mixed into the synthetic gas, which not only affects the property of the synthetic gas, but also adheres to the pipes and devices together with the tar, thereby resulting a serious corrosion to the devices and pipes.

In view of the above existing problems, technologies of direct gasification of biomass are difficult to be applied in practical production. Thus, a method for gasifying the biomass which can be applied in industrial production and converted to commercial benefits is desired.

SUMMARY OF THE INVENTION

In view of the above-described problems, it is one objective of the invention to provide a method and a system for indirect gasification of biomass using water vapor. The method features easy control, energy saving, and low cost; the produced synthetic gas has high efficiency, high heat value, and is absent of tar or alkali metal oxides.

To achieve the above objective, there is provided a method for indirect gasification of biomass using water vapor. The method employs a high temperature superheated water vapor as an oxidant and an energy carrier to transform the biomass into a crude synthetic gas in a gasifier, quenches the crude synthetic gas in a spray tower, and finally produces a clean synthetic gas. The method comprises the following steps:

a) Grinding the biomass, feeding the biomass into the gasifier while spraying a high temperature superheated water vapor into the gasifier, controlling the gasifier at an operating temperature of 1200-1600° C., fully contacting the biomass with the high temperature superheated water vapor to carry out desiccation, separation of volatile matters, pyrolysis, and gasification, and producing the crude synthetic gas and an ash. Because the operating temperature of the gasifier is higher than a temperature to form tars, tars and cokes produced during the pyrolysis are gasified, and the crude synthetic gas almost contains no tar. The ash is output from an ash outlet of the gasifier, after being cooled down or heat recovery, the ash is transported to an ash storehouse for comprehensive utilization.

b) Transporting the crude synthetic gas into the spray tower, quenching the crude synthetic gas by spraying water to cool down the crude synthetic gas to a temperature of 650-800° C. Because a temperature of the crude synthetic gas after quenching is lower than sublimation temperatures of alkali metal oxides comprising K and Na, besides, the alkali metal oxides are easy to be dissolved into the water, thus, slag and minor tar in the crude synthetic gas are condensed, and alkali metal oxides and part of acid gases are dissolved into the spraying water, so that a primary synthetic gas containing no or minor alkali metal oxides are acquired.

c) Cooling, dust removing, deacidifying, and desiccating the primary synthetic gas into the clean synthetic gas. The process of cooling down not only is a necessity in the whole process for production of synthetic gas, but also recovers a large amount of sensible heat for comprehensive utilization. The process of dust removal separates the dust from the crude synthetic gas, and lowers the dust concentration of the gas to 50 mg/Nm³ below. Harmful gases like $H_2S$, COS, HCL, $NH_3$, and HCN are removed in the deacidification process. After desiccation, the primary synthetic gas is transformed into the clean synthetic gas, which is stored for latter industrial application.

In a class of this embodiment, the ground biomass in step a) has a particle size of 50 mm×50 mm below and a water content of 40 wt. % below. Biomass of such a particle size and water content fully contacts with the high temperature superheated water vapor, so that processes of desiccation, separation of volatile matters, pyrolysis, and evaporation are stably conducted, and the operating temperature of the gasifier is easy control.

In a class of this embodiment, in step a), a nitrogen atmosphere is provided at a feed inlet of the gasifier in case of fire and explosion caused by leakage of gas from the gasifier.

In a class of this embodiment, in step a), an operating temperature of the gasifier is controlled at 1200-1400° C., and an operating pressure of the gasifier is controlled at 105-109 kPa. Such an operating temperature range ensures that the biomass is fully contacted with the high temperature superheated water vapor and is totally gasified to form the crude synthetic gas containing almost no tar; at the same time the energy consumption is lowered as much as possible, and the performance of the gasifier is largely improved. Furthermore, the gasifier operates at a normal pressure, and no other pressure device is needed, thereby lowering the production cost.

In a class of this embodiment, in step a), a spraying speed of the high temperature superheated water vapor into the gasifier is 35-50 m/s, a retention time of the crude synthetic gas in the gasifier is 15-20 s, and a speed of the crude synthetic gas output from the gasifier is 15-20 m/s. The high input speed of the high temperature superheated water vapor into the gasifier largely improves the contact with the biomass; whereas a relatively lower output speed of crude synthetic gas prevents the ash from aggregating in the outlet of the gasifier and the gas pips.

In a class of this embodiment, in step b), a means to cool down the crude synthetic gas is to quench by cold water, and the temperature of the crude synthetic gas after quenching is lowered to 750-800° C., which is precisely lower than sublimation pints of the alkali metal oxides, thus, the dust, slags, minor tars and alkali metal oxides are separated and brushed away by the cold water, this means can retain the heat energy of the primary synthetic gas as much as possible, which is helpful for heat recovery in the later cooling process.

In a class of this embodiment, in step c) the primary synthetic gas is first cooled down to a temperature of 260-320° C., and then purified. As the temperature of the primary synthetic gas output from the spray tower is still high, about 750-800° C., the cooling process is not only conducive to the later dust collection, deacidification, and desiccation, but also helpful to utilize a temperature difference of 430-540° C. to recover the sensible heat in the primary synthetic gas, so that the exhaust heat is comprehensively used.

A system for gasifying biomass using water vapor according to the above method comprises: a water storage tank; a water pump; a heat exchanger; a plasma torch heater; the gasifier; and the spray tower.

The water storage tank is connected to a water inlet of the heat exchanger via the water pump, a vapor outlet of the heat exchanger is connected to a vapor inlet of the plasma torch heater, and a vapor outlet of the plasma torch heater is connected to a vapor nozzle of the gasifier.

An ash outlet of the gasifier is connected to an ash inlet of an ash cooler, a gas outlet of the gasifier is connected to a gas inlet of the spray tower, a gas outlet of the spray tower is connected to a gas inlet of the heat exchanger, and a gas outlet of the heat exchanger is connected to a dust collector, a deacidification tower, and a desiccator in series.

The plasma torch heater is advantageous in ultra-high temperature heat, fast transfer of heat and mass, high efficiency, and adjustable heat power, when it is used to heat the water in the water storage tank, and a high temperature superheated water vapor can be effectively, successively, and stably produced. The high temperature superheated water vapor is functioned as not only an oxidant but also an energy carrier, so that the gasifier is maintained to work stably. The heat exchanger effectively recovers a large amount of the sensible heat of the primary synthetic gas. The water in the water storage tank is preheated and transformed into a saturated water vapor due to the sensible heat, and the saturated water vapor is then transported to the plasma torch heater, thus, the energy consumption of the plasma torch heater is lowered, and comprehensive utilization of heat energy is achieved.

In a class of this embodiment, a nitrogen protecting device is connected to a feed inlet of the gasifier, so that a nitrogen sealing layer prevents the crude synthetic gas from leaking out of the gasifier, and keeps the air outside the gasifier, which prevents the fire and explosion and assures the property of the crude synthetic gas.

In a class of this embodiment, a plurality of the vapor nozzles are arranged on the gasifier and grouped into 3-4 height levels, and the vapor nozzles of each level are evenly and tangentially arranged along a circumferential direction. Thus, the high temperature superheated water vapor is sprayed into the gasifier from different levels, and an even and stable temperature filed is maintained in different height levels of the gasifier, resulting in a full contact between the high temperature superheated water vapor and the biomass.

Based on the inherent characteristics of the water, ash, volatile matters, and ash fusion point of the biomass, and combined with the operating features of the gasifier, the method of the invention employs the high temperature superheated water vapor, rather than the conventional oxidant air or oxygenized air, to desiccate, remove volatile matter, pyrolyze, and gasify the biomass, and uses spaying water to quench the crude synthetic gas.

Advantages of the invention are summarized hereinbelow:

First, the high temperature superheated water vapor is employed to indirectly gasify the biomass. In the process, the high temperature superheated water vapor is not only an oxidant but also an energy carrier, so that the oxidant air or oxygenized air is not necessary, which means a highly energy consumed air separating device is not necessitated, and the energy consumption in the whole process and the total production cost are largely minimized Second, no self-ignition occurs in the biomass during the successive processes of desiccation, volatile matters separation, pyrolysis, and gasification, thereby effectively solving the problems in conventional gasify process, such as biomass explosion in the gasifier, regional cokings, and difficulties in controlling the gasifier. Because the air or the oxygenized air is not necessary in the reaction anymore, the synthetic gas has a high ratio of $H_2/CO$, and a high content of the effective gas ($CO+H_2$), which is 85% above, thus, the heat value of the synthetic gas is largely improved, and the use of the synthetic gas is much wider.

Third, the transformation of the biomass from the raw materials into the primary synthetic gas is completed in the gasifier and the spray tower successively. Because the high temperature superheated water vapor maintains the operating temperature of the gasifier above the gasify temperature of tars, so that tars pyrolyzed from the biomass are all transformed into the crude synthetic gas, and the carbon conversion is very high. Because the crude synthetic gas is cooled down after being quenched by cold water, not only are the slags cooled down to form particles, but also are alkali metal oxides dissolved into the water, so that the acquired primary synthetic gas is absent of impurities that are dirty and corrosive to the devices and pipes. Besides, the whole process is very short, and the structure is simple, so that it is very convenient to realize production in batches.

Fourth, the plasma torch heater produces all the heat energy which is necessary for biomass gasification by the high temperature superheated water vapor outside the gasifier, the heat energy of the biomass fuel is all transformed into a chemical energy, and the efficiency of the cooled gas is 88% above, which is 8% higher than that of the conventional.

Fifth, the plasma torch heater has a high heat efficiency, and adjustable input power, when the components of the biomass fuel changes, the power of the plasma torch heater can be adjusted, so that it is very convenient to control the temperature of the high temperature superheated water vapor, and maintain the gasifier work stably, and assure a stable output of the primary synthetic gas and a stable property.

Tests have shown that, the method for gasifying biomass using water vapor is applicable to different kinds of biomass fuels, and is especially applicable in industries of the integrated biomass gasification cycle combination and the biomass liquid fuel.

BRIEF DESCRIPTION OF THE DRAWINGS

The invention is described hereinbelow with reference to accompanying drawings, in which the sole FIGURE is a structure diagram of a system for gasification of biomass.

DETAILED DESCRIPTION OF THE EMBODIMENTS

For further illustrating the invention, experiments detailing a method and a system for gasifying biomass using water vapor are described below. It should be noted that the following examples are intended to describe and not to limit the invention.

As shown in the sole FIGURE, a system for indirect gasification of biomass using water vapor, comprises: a belt conveyer 1 for transporting the biomass, a hopper 2, a screw feeder 3, a gasifier 6 for transforming the biomass into a crude synthetic gas, a spray tower 11 for quenching the crude synthetic gas, a plasma torch heater 5 for supplying a high temperature superheated water vapor to the gasifier 6, a water storage tank 10 and a water pump 9 for providing a water source to the plasma torch heater 5, a heat exchanger 12 for comprehensive utilization of heat energy, and a dust collector 13, deacidification tower 14, and a desiccator 15 for later cleaning of the synthetic gas.

An output end of the belt conveyer 1 is arranged above an inlet of the hopper 2, an outlet of the hopper 2 is connected to a feed inlet of the screw feeder 3, and a feed outlet of the screw feeder 3 is connected to a feed inlet of the gasifier 6.

As a key device for transforming the biomass into synthetic gas, the gasifier 6 comprises: a casing, and a liner. The casing is air cooled jacket or water cooled jacket, and thermal insulated at a normal pressure; the liner is made of a material being refractory, anticorrosive, and insulated. The feed inlet of the gasifier 6 is designed on an upper part or an upper end, and the number of the feed inlet is two to four in compliance with the capacity, so that the biomass can be evenly fed into the gasifier 6 and a stable gas flow in the gasifier 6 is maintained. A nitrogen protecting device 4 is disposed at the feed inlet of the gasifier 6 to form a nitrogen sealing layer which can effectively prevent the crude synthetic gas from contacting with the outer atmosphere. A plurality of the vapor nozzles are arranged on the gasifier 6 and grouped into 3-4 height levels, and the vapor nozzles of each level are evenly and tangentially arranged along a circumferential direction. Thus, the high temperature superheated water vapor in the gasifier 6 forms an even and stable flow field, which is fully contacted and mixed with the biomass. An ash outlet is arranged on a bottom of the gasifier 6, and one or two ash outlets can be employed in compliance with the capacity, the ash discharged from the gasifier 6 is in a liquid state. The ash outlet is connected to an ash cooler 7 in which the liquid ash is transformed into a solid state. A gas outlet of the gasifier 6 is arranged on an upper part, or in a lower part, and is connected to a gas inlet of the spray tower 11 via a pipe.

The spray tower 11 is a key device for quenching the crude synthetic gas, in which the crude synthetic gas is directly washed by a circulating cooling water to remove slags, alkali metal oxides, and other impurities in the crude synthetic gas. A gas outlet of the spray tower 11 is connected to a gas inlet of the heat exchanger 12; and a gas outlet of the heat exchanger 12, the dust collector 13, the deacidification tower 14, and the desiccators 15 are connected in series. A gas outlet of the desiccators 15 is connected to a gas storage tank 16 for storing a clean synthetic gas.

The high temperature superheated water vapor sprayed into the gasifier 6 is transformed from soft water or desalted water in the water storage tank 10. An outlet of the water storage tank 10 is connected to a water inlet of the heat exchanger 12 via the water pump 9. The heat exchanger 12 is usually selected from scrapped boiler. A vapor outlet of the heat exchanger 12 is connected to a vapor inlet of the plasma torch heater 5, and a vapor outlet of the plasma torch heater 5 is connected to vapor nozzles of the gasifier 6 via pipes.

The system also comprises the ash storehouse 8, the ash from the ash collector 7 and the spray tower 11 is transported to the ash storehouse 8 by manual or mechanical.

A method for gasifying biomass using water vapor is described as follows:

A) A ground biomass is successively transported to a gasifier 6 via a belt conveyor 1, a hopper 2, and a screw feeder 3 in turn, at the same time nitrogen is input from a nitrogen protecting device 4 into a feed inlet of the gasifier 6. When the biomass is a gray straw, for example twigs and roots of trees, a particle size of the biomass is controlled at 50 mm×50 mm below, and a water content of the biomass is controlled at 40 wt. % below. When the biomass is yellow straw, for example stalks of threshed grain, thatch, stalks of corns, and the particle size of the biomass can be relatively larger than 50 mm×50 mm B) A desalted water is output from a water storage tank 10 to a water inlet of the heat exchanger 12 via a water pump 9, and the desalted water exchanges heat with a crude synthetic gas input from a gas inlet of the heat exchanger, and a sensible heat is extracted by the desalted water, during which 0.4-0.6 Mpa of saturated vapor is produced, the saturated vapor is output from a vapor outlet of the heat exchanger 12 to a plasma torch heater 5 and transformed to a high temperature superheated water vapor.

C) The high temperature superheated water vapor produced by the plasma torch heater 5 is at a temperature of 1200-1600° C., and is input into the gasifier 6 via a vapor nozzle. Operating parameters of the gasifier 6 are: 1200-1400° C. of a temperature, and 105-109 kPa of a pressure. A input speed of the high temperature superheated water vapor into the gasifier is controlled at 35-50 m/s, so that the biomass is fully contacted with the superheated water vapor in a descending process, after processes of desiccation, separation of volatile matters, pyrolysis, and evaporation, a crude synthetic gas and a liquid ash are produced. The crude synthetic gas is maintained in the gasifier 6 for 15-20 s, and an output speed of the crude synthetic gas from the gasifier is controlled at 15-20 m/s.

D) The liquid ash produced in the gasifier 6 is at a temperature of 1200-1400° C., and is input into an ash cooler 7 via an ash outlet of the gasifier 6. After heat recovery, the liquid ash is cooled down to 150° C. below, and is delivered to an ash storehouse 8 for a comprehensive utilization. The crude synthetic gas produced from the gasifier 6 is at the temperature of 1200-1400° C. and is transported to a spray tower 11 via pipes. After being washed by the cold water, the temperature of the crude synthetic gas is dropped to 750-800° C., in which the high temperature slags are transformed into particles, and alkali metal oxides and part of acid gases are dissolved into the cold water and discharged from the spray tower 11, so that a primary synthetic gas is acquired. The cold water in the spray tower can be recycled after precipitation and filtration, and the dregs are transported to the ash storehouse 8.

E) The primary synthetic gas from the spray tower 11 is input into a heat exchanger 12 via a gas inlet after being removed from slags, so that coke, ash, and corrosion are effectively eliminated in the heat exchanger 12. At the moment, the primary synthetic gas is still at a temperature of 750-800° C., after a recovery of sensible heat by the desalted water, the temperature is dropped to 260-320° C. The primary synthetic gas is transported from a gas outlet of the heat exchanger 12 to a dust collector 13 in which dust is removed from the primary synthetic gas, and the primary synthetic gas in an outlet of the dust collector 13 has a dust concentration of no more than 50 mg/Nm$^3$.

F) After dust removal, the primary synthetic gas is transported to a deacidification tower 14, in which harmful gases like $H_2S$, COS, HCL, $NH_3$, and HCN are removed.

G) After deacidification, the primary synthetic gas is transported into a desiccator 15, in which the water is removed, and a clean synthetic gas is acquired. The clean synthetic gas is transported into a gas storage tank 16 via pipes and is stored for industrial application.

After many times of tests and data detections, main components and characteristics thereof of the clean synthetic gas are shown in Table 1.

TABLE 1

Main components and characteristics of clean synthetic gas

| Number | Component | Unit | Value |
|---|---|---|---|
| 1 | CO | % (vol.) | 25-35 |
| 2 | $H_2$ | % (vol.) | 40-50 |
| 3 | $N_2$ + Ar | % (vol.) | 1.6-1.8 |
| 4 | $CO_2$ | % (vol.) | 15-20 |
| 5 | $CH_2$ | % (vol.) | 5-6 |
| 6 | CnHm | % (vol.) | <2 |
| 7 | Heat value of a synthetic gas (LHV) | MJ/Nm$^3$ | 12.5-13.4 |
| 8 | Efficiency of a cooled gas | % | ~88.1 |

As shown in Table 1, the clean synthetic gas produced by the method comprises 85% of a total content of CO and $H_2$, a ratio of $H_2$/CO is larger than 1, a heat value of the synthetic gas is 12.5-13.4 MJ/Nm$^3$, and an efficiency of the cooled gas is about 88%. Thus, the synthetic gas can bring great commercial benefits, and is especially applicable in industries of the integrated biomass gasification cycle combination and the biomass liquid fuel.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A system for gasifying biomass, the system comprising:
   a) a water storage tank (10);
   b) a water pump (9);
   c) a heat exchanger (12), said heat exchanger (12) comprising a water inlet, a vapor outlet, a gas inlet, and a gas outlet;
   d) a plasma torch heater (5), said plasma torch heater (5) comprising a vapor inlet and a vapor outlet;
   e) a gasifier (6), said gasifier (6) comprising a vapor nozzle, an ash outlet, and a gas outlet;
   f) an ash cooler (7), said ash cooler (7) comprising an ash inlet;
   g) a spray tower (11), said spray tower (11) comprising a gas inlet and a gas outlet;
   h) a dust collector (13);
   i) a deacidification tower (14); and
   j) a desiccator (15);

wherein
- said water storage tank (10) is connected to said water inlet of said heat exchanger (12) via said water pump (9);
- said vapor outlet of said heat exchanger (12) is connected to said vapor inlet of said plasma torch heater (5);
- said vapor outlet of said plasma torch heater (5) is connected to said vapor nozzle of said gasifier (6);
- said ash outlet of said gasifier (6) is connected to said ash inlet of said ash cooler (7);
- said gas outlet of said gasifier (6) is connected to said gas inlet of said spray tower (11);
- said gas outlet of said spray tower (11) is connected to said gas inlet of said heat exchanger (12); and
- said gas outlet of said heat exchanger (12) is connected to said dust collector (13), said deacidification tower (14), and said desiccator (15) in series.

2. The system of claim 1, wherein said system further comprises a plurality of vapor nozzles, said vapor nozzles are arranged on said gasifier (6) and grouped into 3-4 height levels, and said vapor nozzles of each level are evenly and tangentially arranged along a circumferential direction.

3. The system of claim 1, wherein said system further comprises a nitrogen protecting device (4) connected to a feed inlet of said gasifier (6).

4. The system of claim 3, wherein said system further comprises a plurality of vapor nozzles, said vapor nozzles are arranged on said gasifier (6) and grouped into 3-4 height levels, and said vapor nozzles of each level are evenly and tangentially arranged along a circumferential direction.

* * * * *